(12) United States Patent
Johnson et al.

(10) Patent No.: US 9,418,107 B2
(45) Date of Patent: Aug. 16, 2016

(54) METHOD AND APPARATUS FOR PERFORMING QUERY AWARE PARTITIONING

(75) Inventors: Theodore Johnson, New York, NY (US); Vladislav Shkapenyuk, Jersey City, NJ (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1701 days.

(21) Appl. No.: 12/182,860

(22) Filed: Jul. 30, 2008

(65) Prior Publication Data

US 2010/0030741 A1 Feb. 4, 2010

(51) Int. Cl.
*G06F 17/30* (2006.01)

(52) U.S. Cl.
CPC ...... *G06F 17/30457* (2013.01); *G06F 17/3046* (2013.01); *G06F 17/30463* (2013.01)

(58) Field of Classification Search
CPC .............. G06F 17/30445; G06F 17/30463; G06F 17/30545; G06F 17/3046
USPC .......................... 707/713, 718, 999.002, 719
See application file for complete search history.

(56) References Cited

U.S. PATENT DOCUMENTS

| | | | |
|---|---|---|---|
| 5,301,317 A * | 4/1994 | Lohman et al. | |
| 5,551,027 A * | 8/1996 | Choy et al. | |
| 6,026,391 A * | 2/2000 | Osborn et al. | |
| 6,081,801 A * | 6/2000 | Cochrane et al. | |
| 6,092,062 A * | 7/2000 | Lohman et al. | |
| 6,112,198 A * | 8/2000 | Lohman et al. | |
| 6,263,345 B1 * | 7/2001 | Farrar et al. | 707/688 |
| 6,345,267 B1 * | 2/2002 | Lohman et al. | |
| 6,618,719 B1 * | 9/2003 | Andrei | |
| 6,763,359 B2 * | 7/2004 | Lohman et al. | 707/718 |
| 6,801,905 B2 * | 10/2004 | Andrei | |
| 6,947,934 B1 * | 9/2005 | Chen et al. | |
| 7,080,062 B1 * | 7/2006 | Leung et al. | |
| 7,383,246 B2 * | 6/2008 | Lohman et al. | |
| 7,562,090 B2 * | 7/2009 | Lohman et al. | |
| 7,984,043 B1 * | 7/2011 | Waas | 707/718 |
| 2003/0055813 A1 * | 3/2003 | Chaudhuri et al. | 707/3 |
| 2003/0135485 A1 * | 7/2003 | Leslie | 707/3 |
| 2003/0158842 A1 * | 8/2003 | Levy et al. | 707/3 |
| 2003/0212668 A1 * | 11/2003 | Hinshaw et al. | 707/3 |
| 2004/0117037 A1 * | 6/2004 | Hinshaw et al. | 700/2 |
| 2005/0033730 A1 * | 2/2005 | Chaudhuri et al. | 707/1 |
| 2006/0080285 A1 * | 4/2006 | Chowdhuri | 707/3 |
| 2006/0129542 A1 * | 6/2006 | Hinshaw et al. | 707/3 |
| 2006/0136368 A1 * | 6/2006 | Young-Lai et al. | 707/2 |
| 2006/0167865 A1 * | 7/2006 | Andrei | 707/4 |
| 2006/0218123 A1 * | 9/2006 | Chowdhuri et al. | 707/2 |
| 2007/0038658 A1 * | 2/2007 | Ghosh | 707/101 |
| 2007/0162425 A1 * | 7/2007 | Betawadkar-Norwood et al. | 707/2 |
| 2008/0147627 A1 * | 6/2008 | Natkovich et al. | 707/4 |
| 2008/0177722 A1 * | 7/2008 | Lohman et al. | 707/4 |
| 2010/0030896 A1 * | 2/2010 | Chandramouli et al. | 709/224 |
| 2013/0346390 A1 * | 12/2013 | Jerzak et al. | 707/719 |

* cited by examiner

Primary Examiner — Vincent Boccio

(57) ABSTRACT

A method and system for providing query aware partitioning are disclosed. For example, the method receives a query plan comprising a plurality of queries, and classifies each one of the plurality of queries. The method computes an optimal partition set for each one of the plurality of queries, and reconciles the optimal partition set of each one of the plurality of queries with at least one subset of queries of the plurality of queries. The method selects at least one reconciled optimal partition set to be used by each query of the plurality of queries, and stores the selected at least one reconciled optimal partition set in a computer readable medium.

9 Claims, 4 Drawing Sheets

METHOD AND APPARATUS FOR PERFORMING QUERY AWARE PARTITIONING

The present invention relates generally to partitioning high-rate data streams and, more particularly, to a method and apparatus for query aware partitioning of high-rate data streams.

BACKGROUND OF THE INVENTION

Data Stream Management Systems (DSMS) are gaining acceptance for applications that need to process very large volumes of data in real time. Applications such as network monitoring, financial monitoring, sensor networks and the processing of large scale scientific data feeds produce data in the form of high-speed streams. Data streams are characterized as an infinite sequence of tuples that must be processed and analyzed in an on-line fashion to enable real-time responses. The increasing use of DSMSs has led to their use for ever more complex query sets.

The load generated by such applications frequently exceeds by far the computation capabilities of a single centralized server. In particular, a single-server instance of a DSMS, e.g., Gigascope, cannot keep up with the processing demands of new networks, which can generate more than 100 million packets per second.

SUMMARY OF THE INVENTION

In one embodiment, the present invention provides a method and system for providing query aware partitioning. For example, the method receives a query plan comprising a plurality of queries, and classifies each one of the plurality of queries. The method computes an optimal partition set for each one of the plurality of queries, and reconciles the optimal partition set of each one of the plurality of queries with at least one subset of queries of the plurality of queries. The method selects at least one reconciled optimal partition set to be used by each query of the plurality of queries, and stores the selected at least one reconciled optimal partition set in a computer readable medium.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
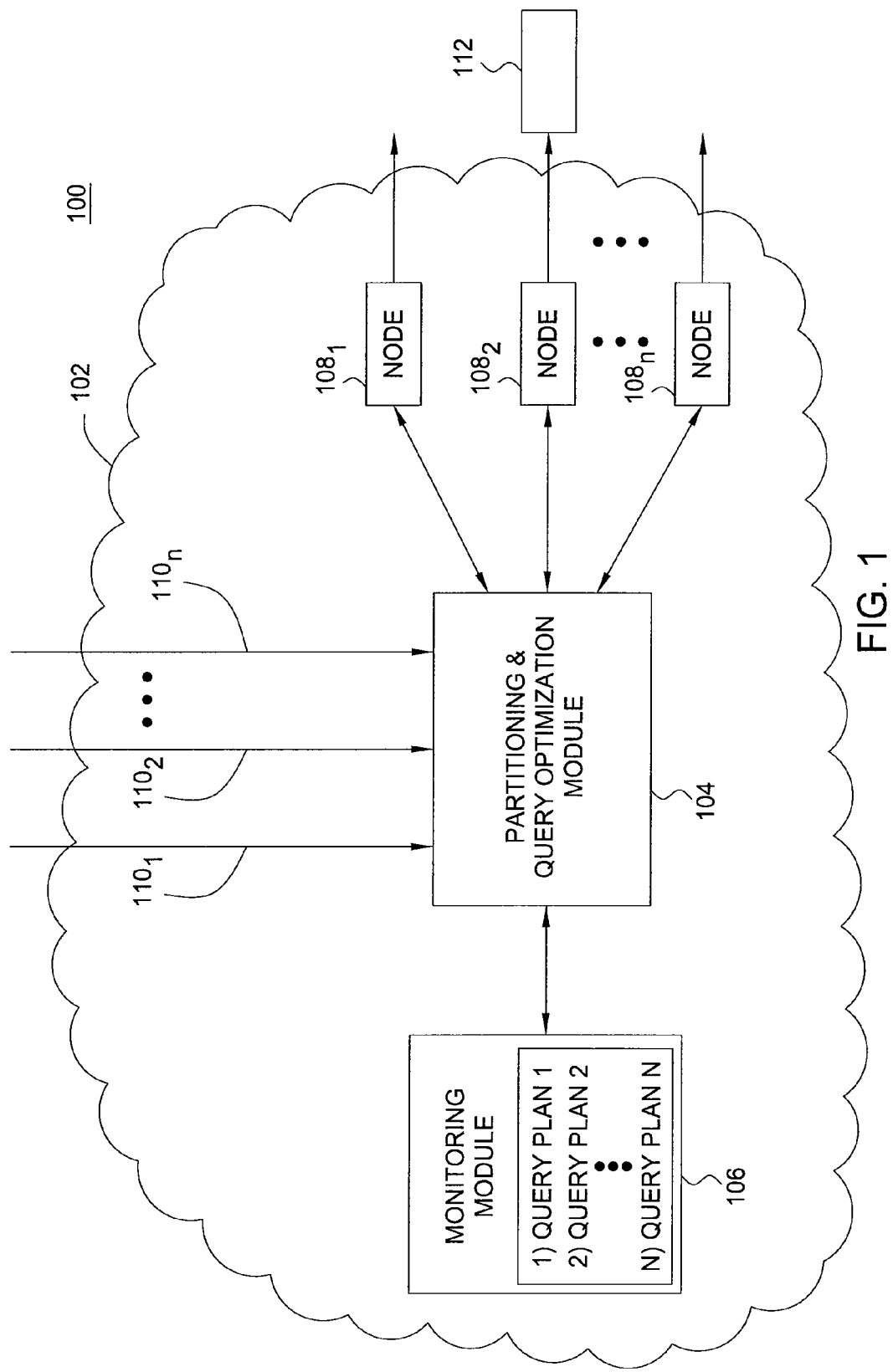
FIG. 1 depicts a high-level block diagram of an exemplary architecture for query aware partitioning according to one embodiment of the present invention.

FIG. 1 depicts a high-level block diagram of an exemplary architecture 100 for query aware partitioning according to one embodiment of the present invention. In one embodiment, the architecture comprises a network 102, a partitioning and query optimization module 104, a monitoring module 106, one or more nodes $108_1$ to $108_n$, a terminal node 112 and one or more data streams $110_1$ to $110_n$. The network 102 may be any type of a network, such as for example, a local area network (LAN), a wide area network (WAN), an intranet, an internet and the like.

In an illustrative embodiment, the monitoring module 106 includes one or more query plans 1 to N. The query plans include instructions on how the data streams $110_1$ to $110_n$ should be processed by nodes $108_1$ to $108_n$. For example, the query plans may include a combination of queries in a query language (e.g., standard query language (SQL)) to execute the processing of data. The query plans may including instructions on how to assign an operator to each node of the plurality of nodes $108_1$ to $108_n$, parameters of each of the assigned operators for each of the plurality of nodes $108_1$ to $108_n$, instructions as to how data from the data streams $110_1$ to $110_n$ should be distributed among nodes $108_1$ to $108_n$ and informing each node of the plurality of nodes $108_1$ to $108_n$ a source and a destination of a data stream $110_1$ to $110_n$ that a node of the plurality of nodes $108_1$ to $108_n$ will process.

Those skilled in the art will recognize that operators are programming elements of a query. For example, an operator may be join, select, merge, aggregate and the like. The types of operators compatible with the present invention are not limited by the examples provided above or discussed herein. Any type of operator may be used.

The parameters for the operators may include the predicates within a particular query. For example, the parameters for a selection operator in a selection query may be a predicate of LENGTH=5 and a selection list (i.e. the desired data or output) such as a source IP address. Further examples of parameters are provided with respect to the exemplary aggregation and join queries discussed below.

The monitoring module 106 may be in communication with the partitioning and query optimization module 104. The partitioning and query optimization module receives the data streams $110_1$ to $110_n$. The partitioning and query optimization module is also in communication with the one or more nodes $108_1$ to $108_n$. The partitioning and query optimization module may be implemented within a server or computer having a processor, input output devices and memory (not shown). In one embodiment, the monitoring module 106 and the partitioning and query optimization module 104 may be located within the same device, for example a server of a computer, or be located on separate devices, for example separate servers or separate computers.

The nodes $108_1$ to $108_n$ are used to execute an optimized query plan, as discussed below. Although only one level of nodes $108_1$ to $108_n$ is illustrated in FIG. 1, it should be noted that there may be additional levels of nodes to execute various levels of the optimized query plan. Moreover, one or more of the nodes $108_1$ to $108_n$ may reside on a single host (not shown). In other words, there may be one or more hosts in network 102 and each host may have one or more of the nodes $108_1$ to $108_n$.

Ultimately, the data may be forwarded to a terminal node 112 for final processing. The terminal node 112 may output or display the final results of the optimized query plan to a user, another node or the monitoring module 106. Alternatively, the terminal node 112 may store the output of the final processing of data in a computer readable medium for later retrieval or use.

When a user desires to monitor or gather a particular data set (also referred to herein as tuples) within one or more of the data streams $110_1$ to $110_n$, the partitioning and query optimization module 104 may obtain an appropriate query plan from the monitoring module 106.

Currently, the query plan may be applied to the data streams $110_1$ to $110_n$ by brute force. As a result, the processing capabilities of current network architectures are unable to apply the queries and process the data to execute the query plan in an efficient manner.

The present invention provides a novel query aware partitioning method provided by the partitioning and query optimization module 104. Given the appropriate query plan from monitoring module 106, the partitioning and query optimization module 104 may calculate an optimal partitioning set to transform the query plan provided by monitoring module 106 into an optimized query plan. As a result, the one or more nodes $108_1$ to $108_n$ coupled to the partitioning and query optimization module 104 may execute the optimized query plan. An exemplary method for calculating the optimized query plan is discussed below with reference to FIG. 2.

Figure 2:
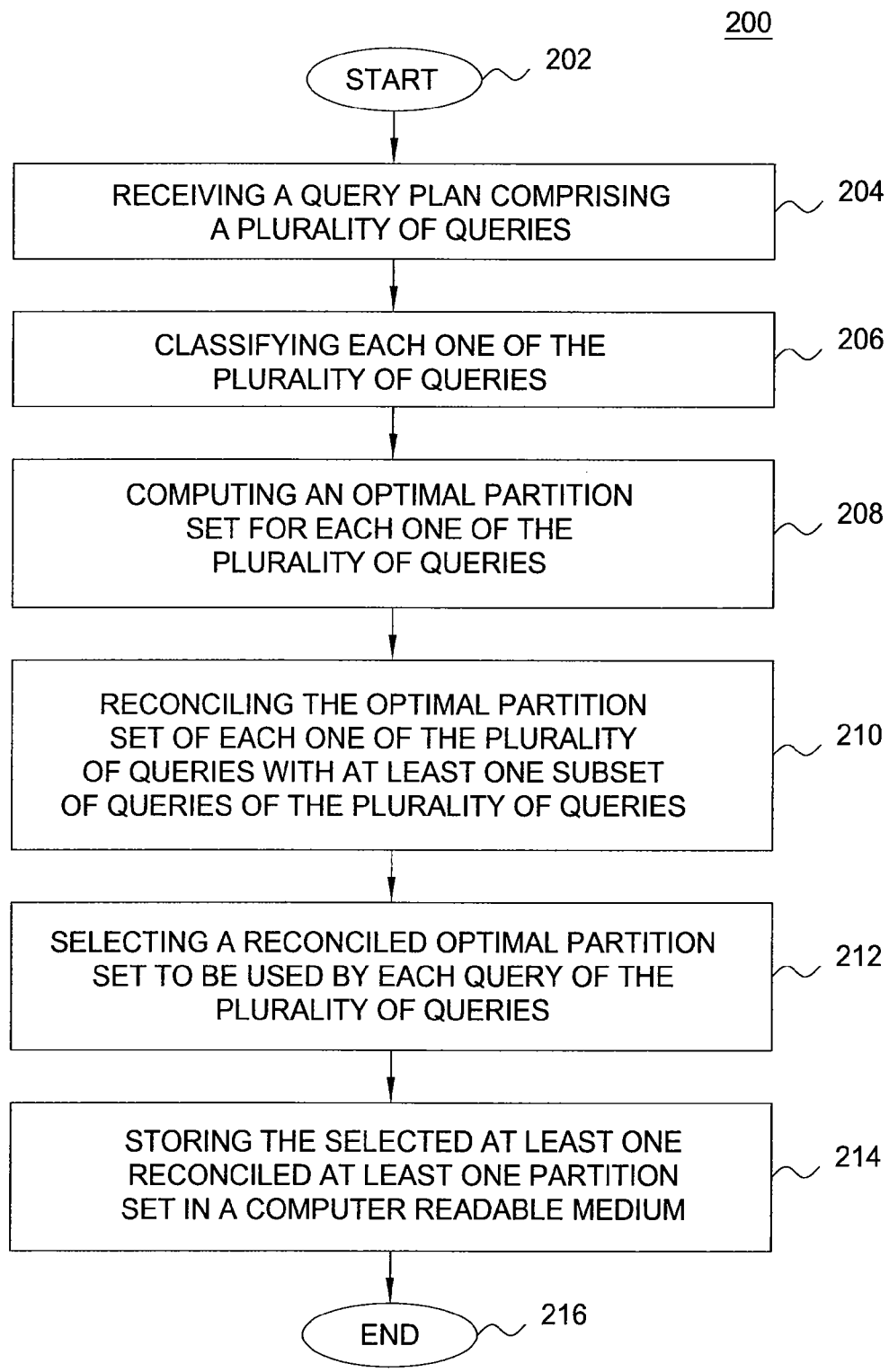
FIG. 2 depicts a flow diagram of a method for query aware partitioning according to one embodiment of the present invention.

FIG. 2 depicts a flow diagram of a method 200 for query aware partitioning according to one embodiment of the present invention. In one embodiment, method 200 may be executed by the partitioning and query optimization module 104.

The method 200 begins at step 202 and proceeds to step 204. In step 204, the method 200 receives a query plan comprising a plurality of queries. As discussed above, the query plan may be received by the partitioning and query optimization module 104 from the monitoring module 106. In addition, the query plan may comprise a plurality of queries. A group of different queries with different operators may be used to construct a query plan, which will obtain a desired set of data from the data streams $110_1$ to $110_n$.

Those skilled in the art will recognize how to construct various queries of different operators such as aggregate queries, join queries, select queries and the like. For illustration, a few formats of various queries are provided herein. For example, an aggregation query may have the format:

SELECT tb, srcIP, destIP, sum(len)
FROM PKT
GROUP BY time/60 as tb, srcIP, destIP The SELECT predicate indicates selecting to report the fields tb, srcIP, destIP and sum(len) where tb represents time bucket, srcIP represents a source IP address, destIP represents a destination IP address and sum(len) represents the sum of all values in the length field for unique values of tb, srcIP and destIP of a data stream. The FROM predicate identifies a source of the data stream, in this case data stream PKT. The GROUP BY time bucket indicates that the data will be grouped by tb of time/60, srcIP and destIP.

In another example, a join query may have the format:
SELECT time, PKT1.srcIP,
PKT1.destIP, PKT1.len+PKT2.len
FROM PKT1 JOIN PKT2
WHERE PKT1.time=PKT2.time and
PKT1.srcIP=PKT2.srcIP and
PKT1.destIP=PKT2.destIP The SELECT predicate indicates selecting time, PKT1.srcIP, PKT1.destIP, PKT1.len +PKT2.len, where PKT1.srcIP represents the source IP address from data stream PKT1, PKT1.destIP represents the destination IP address from data stream PKT1, PKT1.len+PKT2.len represents the sum of the length of data selected from data streams PKT1 and PKT 2. The FROM predicate represents the sources of the data streams that will be joined, for example PKT1 and PKT2. The WHERE predicate represents where time of data stream PKT1 is equal to time of data stream PKT2 and similarly for source IP address and destination IP address for data streams PKT1 and PKT2. Although only two types of queries are detailed above, those skilled in the art will recognize that the syntax for additional queries may be derived from the examples provided above.

At step 206, method 200 classifies each one of the plurality of queries found in the query plan. For example, the query plan may comprise a combination of select queries, aggregation queries, join queries and the like.

At step 208, method 200 computes an optimal partition set for each one of the plurality of queries. The computation of an optimal partition set determines a distribution plan for incoming data from data streams $110_1$ to $110_n$ that maximizes the amount of data reduction that can be preformed locally before transporting the intermediate results to a node that produces final results, e.g., terminal node 112.

For example, in one embodiment the optimal partitioning set for aggregation queries may be defined as follows:
SELECT $expr_1$, $expr_2$, ..., $expr_n$
FROM STREAM_NAME
WHERE tup_predicate
GROUP BY temp_var, $gb\_var_1$, ...,
$gb\_var_m$
HAVING group_predicate In an optimal partitioning set for an aggregation query, only a subset of the group by variables ($gb\_var_1$, ..., $gb\_var_m$) that can be expressed as a scalar expression ($expr_1$, $expr_2$, ..., $expr_n$) involving an attribute of one of the source input streams (STREAM_NAME) are considered. As a result, Lemma 1 may be defined as follows:

Lemma 1. Let G be a set of group-by attributes referenced by the query Q and let P be portioning set, P=(sc_expr($attr_1$), sc_exp($attr_2$), ... sc_exp($attr_n$)). Query Q is compatible with partitioning set P if and only if for any pair of tuples tup1 and tup2 G(tup1)=G(tup2)⇒P(tup1)=P(tup2).

Following Lemma 1, any compatible partitioning set for aggregation query Q will have the form {sc_exp($gb\_var_1$), ..., sc_exp($gb\_var_n$)}, where sc_exp(x) is any scalar expression involving x. Given that there are an infinite number of possible scalar expressions, every aggregation query has an infinite number of compatible partitioning sets. Furthermore, any subset of a compatible partitioning set is also compatible.

In another example, the optimal partitioning set for join queries may be defined as follows:
SELECT $expr_1$, $expr_2$, ..., $expr_n$
FROM STREAM1 AS S
{LEFT|RIGHT|FULL} [OUTER] JOIN
STREAM2 AS R
WHERE STREAM1.ts=STREAM2.ts
and STREAM1.$var_{1j}$=STREAM2.$var_{2l}$
and ... STREAM1.$var_{1k}$=
STREAM2.$var2_k$ and other_predicates;

For ease of analysis, only join queries whose WHERE clause is in Conjunctive Normal Form (CNF) in which at least one of the CNF terms is an equality predicate between the scalar expressions involving attributes of the source streams are considered. In an optimal partitioning set for a join query, let J be a set of all such equality predicates {sc_exp(R.$rattr_1$)=sc_exp(S.$sattr_1$), ..., sc_exp(R.$rattr_n$)=sc_exp(S.$sattr_n$)}. As with aggregation queries, only scalar expressions involving attributes of the source input streams are considered. Join queries that do not satisfy these requirements are considered as incompatible with any partitioning set. As a result, Lemma 2 may be defined as follows:

Lemma 2. Let J be a set of equality join predicates of the query Q and let P be portioning set, P=(sc_expr($attr_1$), sc_exp($attr_2$), . . . sc_exp($attr_n$)). Query Q is compatible with partitioning set P if and only if there exists a non-empty subset J' of J s. t. for any pair of tuples tup1 from R and tup2 from S s. t. J' is satisfied ⇒ P(tup1)=P(tup2).

Following Lemma 2, the partitioning sets for two streams S and R using Partn_R={sc_exp($R.attr_1$), . . . , sc_exp($R.attr_n$)} and Partn_S={sc_exp($S.attr_1$), . . . , sc_exp($S.attr_n$)}, respectively, can be computed. It also follows that the join query is compatible with any non-empty subset of its partitioning set. Since it is not feasible to partition the input stream simultaneously in multiple ways, Partn_R and Partn_S will need to be reconciled to compute a single partitioning scheme, which will be discussed below. Those skilled in the art will recognize that optimal partitioning sets for other queries, such as for example, union queries, select queries and the like, may be derived from the optimal partitioning set examples for aggregation and join queries provided above.

At step 210, the method 200 reconciles the optimal partition set of each one of the plurality of queries with at least one subset of queries of the plurality of queries. Once an optimal partition set for each one of the plurality of queries is computed, the optimal partition sets much be tested against all other queries and subset of queries within the query plan to ensure compatibility. This process is referred to herein as reconciling the optimal partition sets.

Reconciling the optimal partition sets may generate a new grouping set compatible with another query or subset of queries. This new grouping set may be referred to as Reconcile_Partn_Sets( ), defined as follows:

Def. Given two partitioning set definitions PS1 for query Q1 and PS2 for query Q2, Reconcile_Partn_Sets( ) is defined to return the largest partitioning set Reconciled_PS such that both Q1 and Q2 are compatible with partitioning using a Reconciled_PS. The empty set is returned if no such Reconciled_PS exists.

Considering a simple case of partitioning sets consisting of just data stream attributes (i.e. no scalar expressions involved), Reconcile_Partn_Sets ( ) returns the intersection of the two partition sets. For example, Reconcile_Partn_Sets ({srcIP, destIP}, {srcIP, destIP, srcPort, destPort}) is the set {srcIP, destIP}. For a more general case of partitioning sets involving arbitrary scalar expressions, Reconcile_Partn_Sets uses scalar expression analysis to find a "least common denominator". For example, Reconcile_Partn_Sets ({sc_exp (time/60), sc_exp(srcIP), sc_exp(destIP)}, {sc_exp(time/90}, sc_exp(srcIP & 0xFFF0)}) is equal to a set {sc_exp (time/180, sc_exp(srcIP & 0xFFF0)}. The Reconcile_Partn_Sets function can make use of either simple or complex analysis based on the implementation time that is available.

At step 212, the method 200 selects a reconciled optimal partition set to be used by each query of the plurality of queries in the query plan. For example, the selected reconciled optimal partition set may be selected based on a compatibility and lowest cost computation.

In one embodiment, computing a compatible partitioning set for an arbitrary query plan essentially requires reconciling all the requirements that all nodes in the query graph place on compatible partitioning sets. A simplified implementation of the procedure of computing compatible sets PS for a Directed Acyclic Graph (DAG) with n nodes would be as follows:

1. For every query node $Q_i$ in a query DAG, compute the compatible partitioning set PS($O_i$).
2. Set PS=PS($Q_1$).
3. For every i∈[1 to n], set PS=Reconcile_Partn_Sets(PS, PS($Q_i$).

Although many realistic query sets result in the partitioning set PS to be empty due to conflicting requirements of different queries, a reasonable approach is to try to satisfy a subset of nodes in a query DAG in order to minimize the total cost of the query plan. There are a variety of different cost models that can be used to drive the optimization.

In one exemplary cost model, the cost model defines a cost of the query plan to be the maximum amount of data a single node $118_1$ to $118_n$ in the query plan is expected to receive over the network 102 during one time epoch. This model tries to avoid query plans that overload a single node $118_1$ to $118_n$ with excessive amounts of data.

Let R be the rate of an input stream $110_1$ to $110_n$ on which the query set is operating, and PS be a partitioning set. For each query node Qi in a potential query execution plan we define the following variables:

selectivity_factor (Qi). The selectivity factor estimates the expected ratio of the number of output tuples to the number of input tuples Qi receives during one epoch.

out_tuple_size (Qi). Expected size of the output tuple produced by Qi.

recursively define input_rate (Qi) to be R if Qi is a leaf node and to be the sum of all output_rate (Qj) s.t. Qj is a child of Qi.

output_rate (Qi)=(input_rate (Qi)/in_tuple_size (Qi))*selectivity_factor (Qi)*out_tuple_size (Qi).

The cost(Qi) is defined in the following way:
    0 if it processes only local data.
    input_rate (Qi) if Qi is incompatible with PS.
    output_rate (Qi) if Qi is compatible with PS.

The intuition behind this cost formula is that an operator partitioned using a compatible partitioning set only needs to compute the union of the results produced by remote nodes, and therefore the rate of the remote data it is expected to receive is equal to its output rate.

Finally, we define the cost of the query plan Qplan given partitioning PS cost(Qplan, PS) to be the max cost(Qi) for all i. The goal of this formula is to prevent overloading a single node rather than minimizing average load.

With the above cost model, an optimal reconciled portioning set may be selected at step 212 based upon compatibility and lowest cost. A method for computing a lowest cost takes a query DAG as an input and produces a partitioning set that minimizes the cost of the query plan. The method enumerates all possible compatible partitioning sets using dynamic programming to reduce the search space. An outline of the method is as follows:

1) For every query node $Q_i$ in a query DAG, compute its compatible partitioning set PS(i) and cost(Qplan, PS(i)). Add non-empty PS(i) to a set of partitioning candidates.
2) Set PS to be PS(i) with minimum cost(Qplan, PS(i)).
3) For every candidate pair of partitioning sets PS(i) and PS(j) compute compatible partitioning set PS(i, j)=Reconcile_Partn_Sets(PS(i), PS(j)) and cost(Qplan, PS(ij)). Add non-empty PS(i, j) to a set of candidate pairs.
4) Set PS to be PS (i, j) with minimum cost(Qplan, PS(l, j)).
5) Similarly to previous step, expand candidate pairs of partitioning sets to candidate triples and compute corresponding reconciled partitioning sets and minimum cost.

6) Continue the iterative process until we exhaust the search space or end up with an empty list of candidates for the next iteration.

Since it is impossible for a partitioning set to be compatible with a node and not to be compatible with one of the node predecessors, the following heuristics can be used to further reduce the search space:

Only consider leaf nodes for a set of initial candidates.

When expanding candidate sets only consider adding a node that is either an immediate parent of a node already in the set or is a leaf node.

At step 214, the method 200 stores the selected at least one reconciled at least one partition set in a computer readable medium. For example, the computer readable medium may be a hard drive disk, a read only memory (ROM), a random access memory (RAM), floppy disk drive, or any other data storage device. The selected at least one reconciled at least one partition set may then be retrieved and applied to the query plan as described below with reference to FIG. 3.

Figure 3:
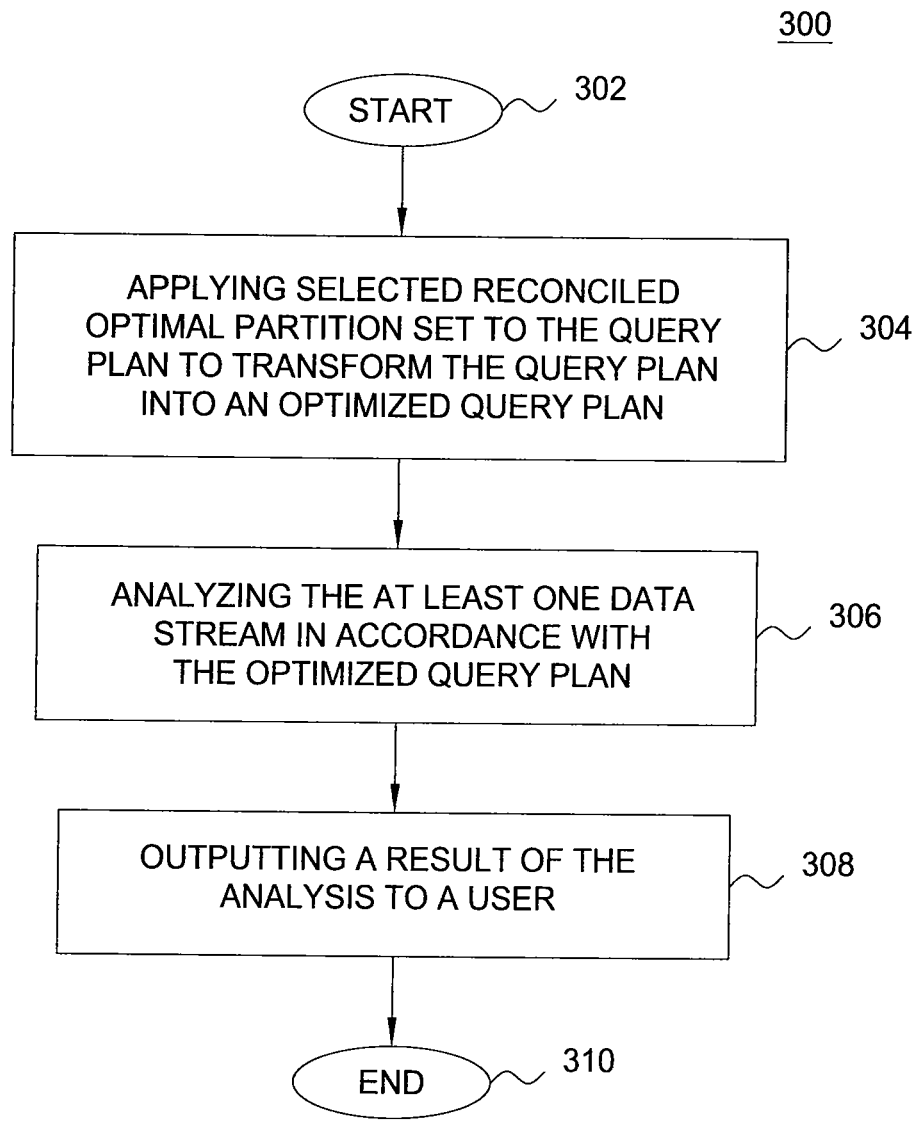
FIG. 3 depicts an additional flow diagram of a method for query aware partitioning.

FIG. 3 depicts an additional flow diagram of a method 300 for query aware partitioning according to one embodiment of the present invention. In one embodiment, method 300 may also be executed by the partitioning and query optimization module 104.

The method 300 begins at step 302 and proceeds to step 304. At step 304, the method 300 applies the selected reconciled optimal partition set, from method 200, to the query plan to transform the query plan into an optimized query plan. In one embodiment, the optimized query plan has a plurality of optimized queries that are executed in accordance with the selected reconciled optimal partition set. The optimized query plan distributes data received from at least one data stream $110_1$ to $110_n$ to a plurality of nodes $108_1$ to $108_n$ in accordance with the selected reconciled optimal partition set.

In one embodiment, transforming the query plan into an optimized query plan comprises two phases. The first phase is to build a partition-agnostic query plan. Let S be a partitioned source input data stream consumed by a query set, $S=\cup Partn_i$. A partition-agnostic query plan is created by creating an additional merge query node that computes a stream union of all the partitions and making all query nodes $108_1$ to $108_n$ that consume S read from the merge node. Since each host might have multiple CPUs/Cores, multiple partitions may be allocated to each participating host depending on the host capabilities.

The second phase is to perform query plan transformation in a bottom-up fashion. All transformation rules that are used for partition-related query optimization consist of two procedures: Opt_Eligible( ) and Transform( ). Opt_Eligible( ) is a Boolean test that takes a query node and returns true if it is eligible for partition-related optimization. Transform( ) replaces the node that passed Opt_Eligible( ) test by equivalent optimized plan. The pseudo code for query optimizer is given below:
1) Compute a topologically sorted list of nodes in the query DAG $Q_1, Q_2, \ldots, Q_n$ starting with the leaf nodes.
2) For every $i \in [1\ to\ n]$
   If Opt_Eligible($Q_i$)
       Transform($Q_i$, Partitiong_Info)

Performing the transformation in a bottom-up fashion allows transformation compatible leaf nodes to be easily propagated through the chain of compatible parent nodes. A detailed description of the implementation of Opt_Eligible( ) and Transform( ) for aggregations queries and join queries are discussed below. The present transformation methods developed for aggregation queries and join queries can be applied to simpler queries such as selection queries, merge queries, projection queries and the like.

For transformation of aggregation queries, the Opt_Eligible( ) procedure for an aggregation query Q and partitioning set PS returns true if the following conditions are met:

Query Q has a single child node M of type merge (stream union).

Each child node of M is operating on single partition consistent with PS.

Q is compatible with PS.

Q is the only parent of M.

The last requirement is important to prevent the optimizer from removing the merge nodes that are used by multiple consumers.

In a transformation for compatible aggregation query nodes, the main idea behind the Transform( ) procedure for eligible aggregation query Q is to push the aggregation operator below a merge M and allow it to execute independently on each of the partitions. For each of the inputs of M a copy of Q can be created and pushed below the merge operator. In this embodiment, data is fully aggregated before being sent to a terminal node 112 that does not require any additional processing.

In a transformation for incompatible aggregation queries (i.e. aggregation queries that fail the Opt_Eligible( ) test), options are still available that perform better than the default partition-agnostic query execution plan. The idea behind the proposed optimization is the concept of partial aggregates. This idea may be illustrated on a query that computes a count of number of packets sent between pairs of hosts:

Query tcp_count:
　　SELECT time, srcIP, destIP, srcPort, COUNT(*)
　　FROM TCP
　　GROUP BY time, srcIP, destIP, srcPort The tcp_count can be split into two queries called sub- and super-aggregate:

Query super_tcp_count:
　　SELECT time, srcIP, destIP, srcPort, SUM(cnt)
　　FROM sub_tcp_count
　　GROUP BY time, srcIP, destIP, srcPort
Query sub_tcp_count:
　　SELECT time, srcIP, destIP, srcPort, COUNT(*) as cnt
　　FROM TCP
　　GROUP BY time, srcIP, destIP, srcPort All the SQL's built-in aggregates can be trivially split in a similar fashion. Many commonly used User Defined Aggregate Functions (UDAFs) can also be easily split into two components. Note that all the predicates in the query's WHERE clause can be pushed to sub-aggregates, but all predicates in the HAVING clause need complete aggregate values and, therefore, must be evaluated in super-aggregate.

For transformation of join queries and other multi-way join queries, the Opt_Eligible( ) procedure for a join query Q and partitioning set PS returns true if the following conditions are met:

Query Q has a two children nodes M1 and M2 of type merge (stream union).

Each child node of M1 and M2 is operating on single partition consistent with PS.

Q is compatible with PS.

Q is the only parent of M1 and M2.

The idea behind the Transform( ) procedure for an eligible join query Q is to perform pair-wise joins for each of partition of input stream. This is accomplished by creating a copy of join operator and pushing it below the child merges. The left side partitions that do not have matching right side partitions and similarly unmatched right side partitions are ignored for inner join computations. For outer join computations, unmatched partitions are passed through special projection operator that adds appropriate NULL values needed by outer join. The output tuples produced by the projection operator are then merged with the rest of the final results.

At step 306, the method 300 analyzes the at least one data stream $110_1$ to $110_n$ in accordance with the optimized query plan. For example, using the optimized query plan, a desired set of data from one or more of the data streams $110_1$ to $110_n$ on may be obtained in a more efficient way.

At step 308, the method 300 outputs a result of the analysis to a user. For example, as discussed above, the data may be transmitted to a terminal node 1 12 for final processing. The terminal node 112 may output the data to a user by displaying the data on a display device. Alternatively, the data may be stored at the terminal node 112 for further analysis or may be forwarded to another node $118_1$ to $118_n$, the monitoring module 106 or the partitioning and query optimization module 104. The method 300 concludes at step 310.

It should be noted that although not specifically specified, one or more steps of method 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step.

Figure 4:
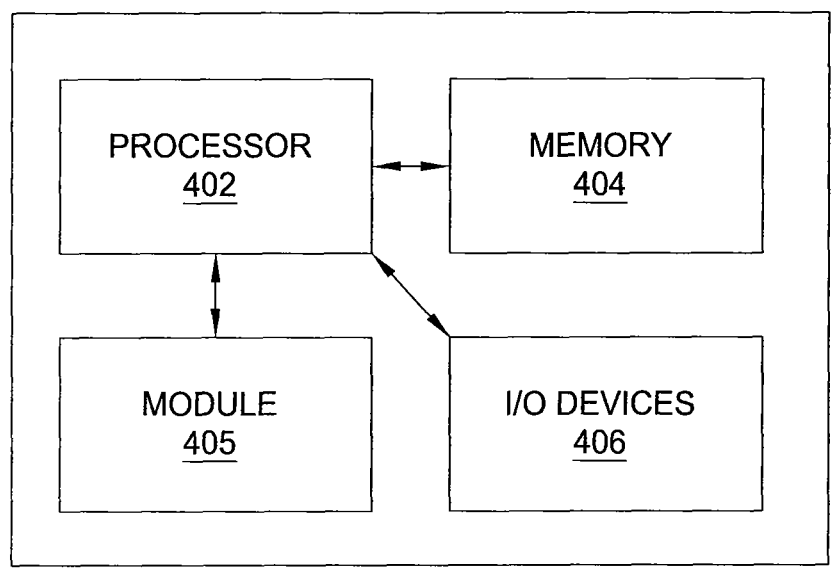
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for query aware partitioning, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for query aware partitioning can be loaded into memory 404 and executed by processor 402 to implement the functions as discussed above. As such, the processes provided by the module 405 for query aware partitioning (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a query, comprising:
  receiving, via a processor, a query plan comprising a plurality of queries;
  classifying, via the processor, each one of the plurality of queries;
  computing, via the processor, an optimal partition set for each one of the plurality of queries, wherein the optimal partition set maximizes an amount of data reduction that is performed locally by a node of the processor before transporting an intermediate result to a terminal node that produces a final result, wherein only leaf nodes are considered for a set of initial candidates;
  reconciling, via the processor, the optimal partition set of each one of the plurality of queries with a subset of queries of the plurality of queries, wherein the reconciling is performed after the computing, wherein reconciling comprises;
    testing the optimal partition set of each one of the plurality of queries against all other queries to ensure compatibility;
    selecting an optimal partition set that is compatible with at least two queries of the plurality of queries and has a lowest cost based upon a lowest cost computation, wherein the lowest cost computation comprises a reconciled optimal partition set that provides a least amount of data transfer between a plurality of nodes, wherein a cost is defined as 0 when a query node of the query plan processes only local data, as an input rate of the query node when the query node is incompatible with the optimal partition set and as an output rate of the query node when the query node is compatible with the optimal partition set; and
    using the optimal partition set for the at least two queries of the plurality of queries;
  selecting, via the processor, the reconciled optimal partition set to be used by each query of the plurality of queries;
  storing, via the processor, the reconciled optimal partition set in a computer readable medium;
  applying, via the processor, the reconciled optimal partition set to the query plan to transform the query plan into an optimized query plan, wherein the applying the optimized query plan comprises:
    assigning an operator to each node of a plurality of nodes that each node will execute, wherein at least two of the plurality of nodes perform different operators;
    providing a parameter for each operator at each of the plurality of nodes; and
    informing each node of the plurality of nodes a source and a destination of a data stream;
  applying, via the processor, the optimized query plan to the data stream; and
  outputting, via the processor, a result of the applying to a user.

2. The method of claim 1, wherein the optimized query plan has a plurality of optimized queries and wherein the optimized query plan distributes data received from the data stream to a plurality of nodes in accordance with the reconciled optimal partition set.

3. The method of claim 1, wherein the reconciling is repeated until all possible combination of subsets of the plurality of queries have been exhausted.

4. The method of claim 1, wherein the query plan is used for extracting data from a high-rate data stream.

5. A non-transitory computer-readable medium storing a plurality of instructions, which when executed by a processor, cause the processor to perform operations for processing a query, the operations comprising:
  receiving a query plan comprising a plurality of queries;
  classifying each one of the plurality of queries;

computing an optimal partition set for each one of the plurality of queries, wherein the optimal partition set maximizes an amount of data reduction that is performed locally by a node of the processor before transporting an intermediate result to a terminal node that produces a final result, wherein only leaf nodes are considered for a set of initial candidates;

reconciling the optimal partition set of each one of the plurality of queries with a subset of queries of the plurality of queries, wherein the reconciling is performed after the computing, wherein reconciling comprises;

testing the optimal partition set of each one of the plurality of queries against all other queries to ensure compatibility;

selecting an optimal partition set that is compatible with at least two queries of the plurality of queries and has a lowest cost based upon a lowest cost computation, wherein the lowest cost computation comprises a reconciled optimal partition set that provides a least amount of data transfer between a plurality of nodes, wherein a cost is defined as 0 when a query node of the query plan processes only local data, as an input rate of the query node when the query node is incompatible with the optimal partition set and as an output rate of the query node when the query node is compatible with the optimal partition set; and using the optimal partition set for the at least two queries of the plurality of queries;

selecting the reconciled optimal partition set to be used by each query of the plurality of queries;

storing the reconciled optimal partition set in a computer readable medium, applying the reconciled optimal partition set to the query plan to transform the query plan into an optimized query plan, wherein the applying the optimized query plan comprises:

assigning an operator to each node of a plurality of nodes that each node will execute, wherein at least two of the plurality of nodes perform different operators;

providing a parameter for each operator at each of the plurality of nodes; and informing each node of the plurality of nodes a source and a destination of a data stream;

applying the optimized query plan to the data stream; and outputting a result of the applying to a user.

6. The non-transitory computer-readable medium of claim 5, wherein the optimized query plan has a plurality of optimized queries and wherein the optimized query plan distributes data received from the data stream to a plurality of nodes in accordance with the reconciled optimal partition set.

7. The non-transitory computer-readable medium of claim 5, wherein the reconciling is repeated until all possible combination of subsets of the plurality of queries have been exhausted.

8. The non-transitory computer-readable medium of claim 5, wherein the query plan is used for extracting data from a high-rate data stream.

9. An apparatus for processing a query, comprising:
a hardware processor; and
a computer-readable medium storing a plurality of instructions, which when executed by the hardware processor, cause the processor to perform operations, the operations comprising:

receiving a query plan comprising a plurality of queries;

classifying each one of the plurality of queries;

computing an optimal partition set for each one of the plurality of queries, wherein the optimal partition set maximizes an amount of data reduction that is performed locally by a node of the hardware processor before transporting an intermediate result to a terminal node that produces a final result, wherein only leaf nodes are considered for a set of initial candidates;

reconciling the optimal partition set of each one of the plurality of queries with a subset of queries of the plurality of queries, wherein the reconciling is performed after the computing, wherein reconciling comprises;

testing the optimal partition set of each one of the plurality of queries against all other queries to ensure compatibility;

selecting an optimal partition set that is compatible with at least two queries of the plurality of queries and has a lowest cost based upon a lowest cost computation, wherein the lowest cost computation comprises a reconciled optimal partition set that provides a least amount of data transfer between a plurality of nodes, wherein a cost is defined as 0 when a query node of the query plan processes only local data, as an input rate of the query node when the query node is incompatible with the optimal partition set and as an output rate of the query node when the query node is compatible with the optimal partition set; and using the optimal partition set for the at least two queries of the plurality of queries;

selecting the reconciled optimal partition set to be used by each query of the plurality of queries;

storing the reconciled optimal partition set in a computer readable medium;

applying the reconciled optimal partition set to the query plan to transform the query plan into an optimized query plan, wherein the applying the optimized query plan comprises:

assigning an operator to each node of a plurality of nodes that each node will execute, wherein at least two of the plurality of nodes perform different operators;

providing a parameter for each operator at each of the plurality of nodes; and informing each node of the plurality of nodes a source and a destination of a data stream;

applying the optimized query plan to the data stream; and outputting a result of the applying to a user.

* * * * *